United States Patent
Qiu et al.

(10) Patent No.: US 11,231,342 B2
(45) Date of Patent: Jan. 25, 2022

(54) FOUR-DIMENSIONAL IMAGING METHOD FOR STRUCTURAL DAMAGE BASED ON TIME-INVARIANT CHARACTERISTIC SIGNAL

(71) Applicant: Nanjing University of Aeronautics and Astronautics, Nanjing (CN)

(72) Inventors: Lei Qiu, Nanjing (CN); Yuanqiang Ren, Nanjing (CN); Shenfang Yuan, Nanjing (CN); Fang Fang, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 95 days.

(21) Appl. No.: 16/740,509

(22) Filed: Jan. 13, 2020

(65) Prior Publication Data

US 2020/0225112 A1    Jul. 16, 2020

(30) Foreign Application Priority Data

Jan. 11, 2019    (CN) .......................... 201910025875.X

(51) Int. Cl.
    *G01M 5/00*    (2006.01)
(52) U.S. Cl.
    CPC ........ *G01M 5/0033* (2013.01); *G01M 5/0066* (2013.01)
(58) Field of Classification Search
    CPC .............. G01M 5/0033; G01M 5/0066; G06K 9/6226; G01N 29/069; G01N 29/44
    See application file for complete search history.

(56) References Cited

U.S. PATENT DOCUMENTS

2003/0018928 A1* 1/2003 James ............... G06K 9/00536
                                                            714/25
2005/0075846 A1* 4/2005 Kim .................... G01N 29/245
                                                            703/1
(Continued)

OTHER PUBLICATIONS

Qing et al, "The performance of a piezoelectric-sensor-based SHM system under a combined cryogenic temperature and vibration environment", Aug. 5, 2008, Smart Materials and Structures, Smart Mater. Struct. 17 (2008) 055010 (11 pp) (Year: 2008).*

*Primary Examiner* — Stephanie E Bloss

(57) ABSTRACT

The present disclosure provides a four-dimensional imaging method for structural damage based on a time-invariant characteristic signal. The method first uses a probability statistical modeling method to describe the uncertainty distribution of the amplitude of each sampling point in the signal in the healthy state and the damaged state of the structure, respectively. Then the degree of difference between the two distributions at each point is measured to suppress the influence of the time-varying factor, highlight the influence of damage, and construct a time-invariant characteristic signal. Finally, the time-invariant characteristic signal of the pitch-catch channel is fused by using the guided wave imaging method to further enhance the influence of damage. Based on this, four-dimensional imaging is performed to achieve reliable and accurate location of structural damage. The present disclosure solves the problem that the conventional method is difficult to perform reliable damage diagnosis under time-varying service conditions.

3 Claims, 20 Drawing Sheets

(56) References Cited

U.S. PATENT DOCUMENTS

| | | | | |
|---|---|---|---|---|
| 2006/0265146 A1* | 11/2006 | Gorinevsky | ....... | G05B 23/0221 |
| | | | | 702/39 |
| 2008/0289423 A1* | 11/2008 | Gordon | ..................... | G06T 7/10 |
| | | | | 73/602 |
| 2011/0058453 A1* | 3/2011 | Hedi | .................... | G01N 29/262 |
| | | | | 367/103 |
| 2011/0274369 A1* | 11/2011 | Smith | ................ | G01N 29/4463 |
| | | | | 382/280 |
| 2014/0365411 A1* | 12/2014 | Beigi | ..................... | G06N 20/00 |
| | | | | 706/12 |
| 2019/0331301 A1* | 10/2019 | Du | ..................... | G01M 5/0033 |

* cited by examiner

FOUR-DIMENSIONAL IMAGING METHOD FOR STRUCTURAL DAMAGE BASED ON TIME-INVARIANT CHARACTERISTIC SIGNAL

CROSS REFERENCE TO RELATED APPLICATION

The present application is related to and claims the benefit of priority to Chinese Patent Application No. 201910025875X, entitled "Four-Dimensional Imaging Method for Structural Damage Based on Time-Invariant Characteristic Signal", filed with SIPO on Jan. 11, 2019, the contents of which are incorporated herein by reference in its entirety.

BACKGROUND

Field of Disclosure

The present disclosure relates to the technical field of aviation structural health monitoring, in particular, to a four-dimensional imaging method for structural damage based on time-invariant characteristic signals.

Description of Related Arts

Aviation structure is a supporting platform for the development of aviation aircraft. Structural health monitoring technology is of great significance for ensuring structural safety, providing aircraft operational reliability, and reducing maintenance costs. After nearly 20 years of development, aviation structural health monitoring technology has gradually shifted from early basic theoretical research to practical engineering application research.

In the current research on health monitoring methods for aviation structures, the imaging method based on piezoelectric sensor networks and guided waves has the advantages of high monitoring sensitivity, large monitoring range, supporting both online health monitoring and offline monitoring, performing both damage monitoring and impact monitoring, monitoring both metal structure and composite structure. The imaging method is considered one of the most promising aviation structural health monitoring technologies. The methods mainly include path imaging, delay-and-sum imaging, time-reversal imaging, and the like. In general, these methods basically rely on the accurate acquisition of damage-scattered signals. However, in the actual service environment of aviation structures, there are often time-varying factors such as temperature and humidity changes, dynamic loads, and structural boundary condition changes. These time-varying factors will have a significant influence on the guided wave signal, making the signal amplitude uncertain, covering signal changes caused by damage. As a result, although the above method can effectively perform damage monitoring under the stable environment of the laboratory, it is not applicable under the influence of aviation time-varying conditions. Current reliable damage monitoring methods for time-varying environments include imaging methods based on environmental factor compensation, baseline-free imaging methods, etc., but these methods also have their own shortcomings. For example, the environmental factor compensation method can only compensate for a single time-varying environmental factor, and most time-varying factors in service cannot be accurately measured. The baseline-free imaging methods have only been verified by finite element simulation or only on simple structures.

The Gaussian mixture model is a finite mixed probability model. It can approximate the probability distribution of a complex random variable by using a weighted combination of multiple Gaussian components without prior knowledge. The Gaussian mixture model is suitable to describe the uncertainty distribution of guided wave signals under the influence of time-varying environmental factors, and to realize damage monitoring by analyzing the variation trend of the probability distribution characteristics of the model. At present, the research of structural health monitoring methods based on the Gaussian mixture model is still in its preliminary stage. Although there have been studies combining the Gaussian mixture model and the imaging method based on piezoelectric sensor networks and guided waves, this research has great limitations. The Gaussian mixture model suppresses the influence of time-varying factors on the signal characteristic parameters of the pitch-catch channels in the network. The time information of the signal is lost. It can only be combined with the path imaging methods, and it can only monitor and locate the damage occurring on the pitch-catch channel.

SUMMARY OF THE PRESENT DISCLOSURE

The present disclosure provides a four-dimensional imaging method for structural damage based on time-invariant characteristic signal, to solve the problem that the traditional method is difficult to perform reliable damage diagnosis under time-varying service conditions.

The present disclosure provides a four-dimensional imaging method for structural damage based on time-invariant characteristic signal, the method includes: constructing a time-invariant characteristic signal; and four-dimensional imaging damage.

Constructing a time-invariant characteristic signal includes: describing an uncertainty distribution of an amplitude of each sampling point in a guided wave signal under an influence of a time-varying factor by using a probabilistic statistical modeling method, updating a model and quantifying a migration degree of the model during a monitoring process, so as to suppress the influence of the time-varying factor and highlight of the influence of damage, obtaining a time-invariant description of the amplitude of each sampling point, and smooth filtering the time-invariant description of the amplitude of all of the sampling points based on a continuous complex wavelet transform to construct the time-invariant characteristic signal.

Four-dimensional imaging damage includes: fusing a time-invariant characteristic signal of each pitch-catch channel by using a guided wave imaging method, to enhance the influence of damage and perform four-dimensional imaging of the damage, wherein, the four-dimension includes a two-dimensional coordinate, a probability of damage occurrence, and a migration change of the probability over time of each point on a structure; generating a series of imaging results that continuously accumulate damage information and highlight a damage location, and focusing a final imaging result to achieve reliable and accurate location of the structural damage under a time-varying condition.

Further, constructing the time-invariant characteristic signal specifically includes:

(11) when the structure is in a time-varying environment without damage, obtaining R group of baseline characteristic signals of each pitch-catch channel, each group of the baseline characteristic signals contains T sampling points, and R and T are natural numbers greater than 1;

(12) for a sampling point t in the baseline characteristic signals, $1 \leq t \leq T$, constructing a baseline characteristic sample set $X_b(t)=\{A_1, \ldots, A_r, \ldots, A_R\}$ corresponding to the sampling point, wherein $A_r$ is an amplitude of an $r^{th}$ baseline characteristic signal at the sampling point t, $1 \leq r \leq R$, constructing a baseline Gaussian mixture model $\Phi_b(t)$ for the sampling point t based on $X_b$, to describe an uncertainty distribution of $X_b(t)$ under the influence of the time-varying factor;

$$\Phi_b(t) = \sum_{k=1}^{K} w_k \Phi_k\left(A_r \mid \mu_k, \sum_k\right)$$

in the formula, K is a number of Gaussian components in the Gaussian mixture model, $\mu_k$ is a mean vector of a $k^{th}$ Gaussian component, $\Sigma_k$ is a covariance matrix of the $k^{th}$ Gaussian component, $w_k$ is a weight of the $k^{th}$ Gaussian component, $k=1, 2, \ldots, K$, a probability density function of $\Phi_k$ is expressed as follows:

$$\Phi_k\left(A_r \mid \mu_k, \sum_k\right) = \frac{1}{(2\pi)^{\frac{1}{2}} \left|\sum_k\right|^{\frac{1}{2}}} e^{\frac{1}{2}(A_r - \mu_k)^T \Sigma_k^{-1} (A_r - \mu_k)};$$

(13) when the structure is in a time-varying environment and damage monitoring state, updating a probability statistical model of the sampling point t for each monitoring characteristic signal acquired, for an $n^{th}$ update, $1 \leq n \leq N$, updating the baseline characteristic sample set of the sampling point t to an $n^{th}$ monitoring characteristic sample set $X_m^n(t)=\{A_{n+1}, \ldots, A_R, \ldots, A_{R+n}\}$, wherein $A_{R+n}$ is an amplitude of the monitoring characteristic signal obtained at the nth update at the sampling point t, and constructing a monitoring Gaussian mixture model $\Phi_m^n(t)$ for the nth update based on $X_m^n$, to describe an uncertainty distribution of $X_m^n(t)$ under the influence of the time-varying factor;

(14) for the sampling point t, using a KL distance to quantify a degree of migration change of the monitoring Gaussian mixture model $\Phi_m^n(t)$ relative to the baseline Gaussian mixture model $\Phi_b(t)$ of the sampling point t, suppressing the influence of the time-varying factor, and obtaining a time-invariant description $KL(t, n)$ of a signal amplitude characteristic at the sampling point t at the $n^{th}$ update;

$$KL(t, n) = \frac{1}{2} \left\{ tr\left[\sum_m (t)^{-1} \sum_b (t)\right] + [\mu_m^n(t) - \mu_b(t)]^T \sum_m (t)^{-1} [\mu_m^n(t) - \mu_b(t)] - 1 - \ln \frac{\det \sum_m^n (t)}{\det \sum_b (t)} \right\}$$

in the formula, tr is a trace of a matrix, $\Sigma_m^n(t)$ is a covariance matrix of $\Phi_m^n(t)$, $\Sigma_b(t)$ is a covariance matrix of $\Phi_b(t)$, $\mu_m^n(t)$ is a mean matrix of $\Phi_m^n(t)$, $\mu_b(t)$ is the mean matrix of $\Phi_b(t)$, and det is a determinant of the matrix;

(15) repeating operations (12)~(14), after sequentially quantifying a degree of migration change of the probability statistical model of all of the sampling points within 1~T and obtaining the corresponding time-invariant description, smooth filtering the time-invariant description of all the sampling points based on the continuous complex wavelet transform to construct the time-invariant characteristic signal for the $n^{th}$ update.

Further, four-dimensional imaging damage specifically includes:

(21) separately constructing a time-invariant characteristic signal $E_z^n$ for each channel z at the $n^{th}$ update, wherein $1 \leq z \leq Z$, fusing the time-invariant characteristic signal of each the pitch-catch channel by using a delay-and-sum imaging method, to enhance the the influence of the damage and achieve an imaging of the damage, a process includes:

calculating an estimated arrival time $t_z(x, y)$ of a signal at any point $(x, y)$ in a monitoring area of the structure on each of the pitch-catch channels by the following formula:

$$t_z(x, y) = t_{off} + t_{travel} = t_{off} + \frac{\sqrt{(x_z^a - x)^2 + (y_z^a - y)^2} + \sqrt{(x_z^s - x)^2 + (y_z^s - y)^2}}{v}$$

in the formula, $t_{off}$ is a time offset for an excitation signal, $t_{travel}$ is a time required for the guided wave signal to propagate from an exciter of the channel z to point $(x, y)$ and then to a sensor of the channel z, v is an average group velocity of the guided wave signal of each of the pitch-catch channels in the structure, $(x_z^a, y_z^a)$ is a coordinate of the exciter of the channel z, and $(x_z^s, y_z^s)$ is a coordinate of the sensor of the channel z;

obtaining a corresponding value of the point $(x, y)$ in a time-invariant characteristic signal envelope $E_z^n$ of the channel z according to $t_z(x, y)$, calculating the probability of damage occurrence $E^n(x, y)$ of the point $(x, y)$ according to the following formula, and using the probability as a pixel value for damage imaging, $$E^n(x, y) = \sum_{z=1}^{Z} E_z^n(x, y);$$

(22) constantly updating the time-invariant characteristic signal of each channel, repeating operation (21) for each update, and performing four-dimensional imaging of the damage, thereby gradually generating N images that continuously accumulate damage information and highlight the damage location;

(23) combining the results of four-dimensional imaging of damage to transform the pixel value $E^N(x, y)$ of each point in a final $N^{th}$ image as follows, and highlighting the damage location through image focusing to finally achieve reliable and accurate location of damage, $$E^N(x,y) = [E^N(x,y)]^8 \cdot \tan(E^N(x,y))/1.5574.$$

The present disclosure has the following beneficial effects: the method in the present disclosure can effectively suppress the uncertain influence of the time-varying service environment of the aviation structure on the guided wave signal, highlight the influence of damage, construct a time-invariant characteristic signal, and fuse a time-invariant characteristic signal of each of pitch-catch channels by using a guided wave imaging method, to enhance the influence of the damage and perform four-dimensional imaging of the damage, thereby achieving reliable and accurate location of the damage imaging under the time-varying condition.

DETAILED DESCRIPTION OF THE PREFERRED EMBODIMENTS

In order to facilitate the understanding of those skilled in the art, the present disclosure is further described below with reference to the embodiments and the accompanying drawings. The content mentioned in the embodiments is not a limitation on the present disclosure.

Figure 1:
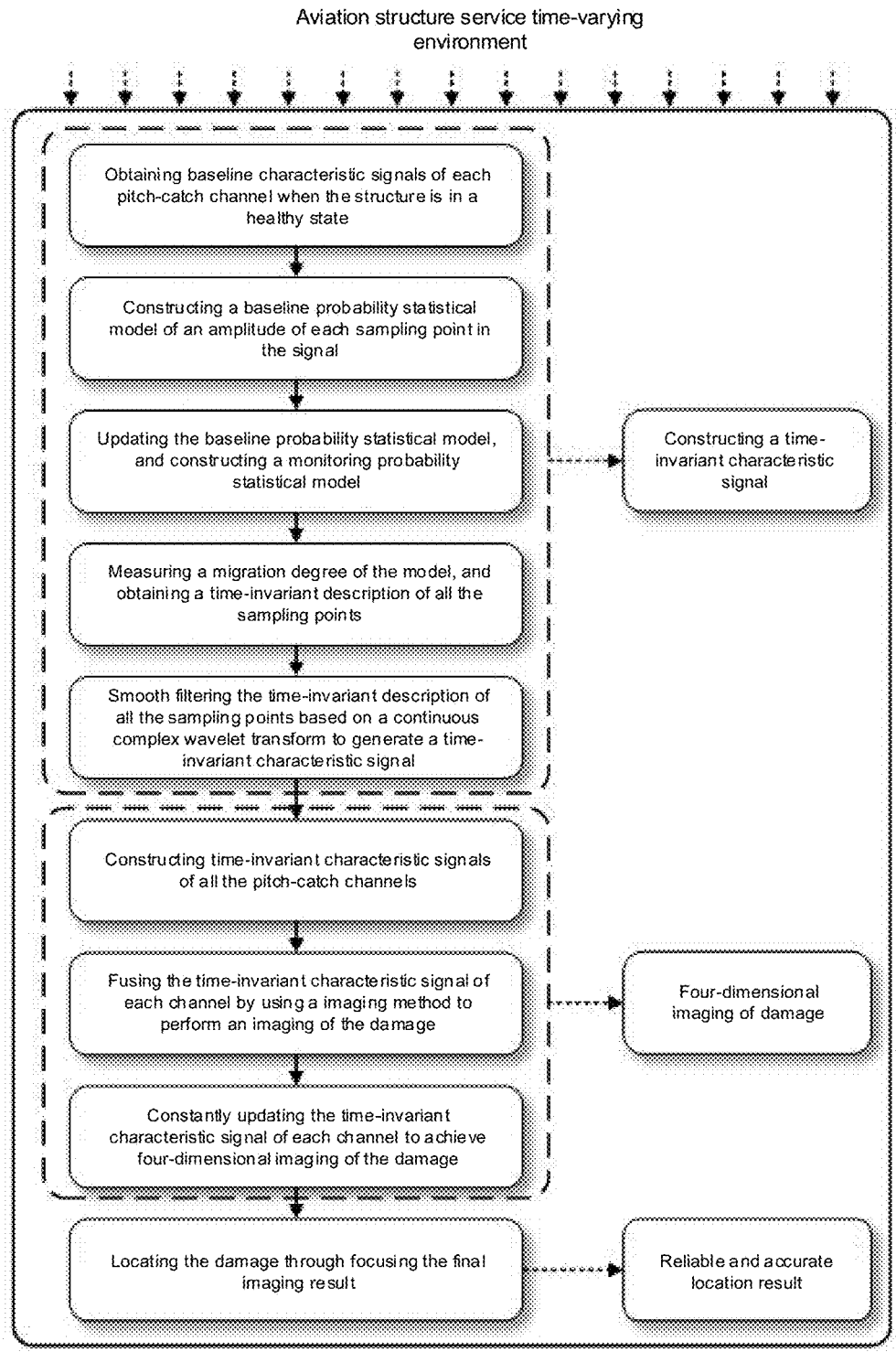
FIG. 1 shows a flow chart of the method according to the present disclosure.

Referring to FIG. 1, the present disclosure provides a four-dimensional imaging method for structural damage based on time-invariant characteristic signal, the method includes: constructing a time-invariant characteristic signal; and four-dimensional imaging damage.

Constructing a time-invariant characteristic signal includes: describing an uncertainty distribution of an amplitude of each sampling point in a guided wave signal under an influence of a time-varying factor by using a probabilistic statistical modeling method, updating a model and quantifying a migration degree of the model during a monitoring process, so as to suppress the influence of the time-varying factor and highlight an influence of damage, obtaining a time-invariant description of the amplitude of each sampling point, and smooth filtering the time-invariant description of the amplitude of all sampling points based on a continuous complex wavelet transform to construct the time-invariant characteristic signal.

Four-dimensional imaging damage includes: fusing a time-invariant characteristic signal of each pitch-catch channels by using a guided wave imaging method, to enhance the influence of the damage and perform four-dimensional imaging of the damage; generating a series of imaging results that continuously accumulate damage information and highlight a damage location, and focusing a final imaging result to achieve reliable and accurate location of the structural damage under a time-varying condition. The four-dimension include a two-dimensional coordinate, a probability of damage occurrence, and a migration change of the probability over time of each point on a structure.

Figure 2A:
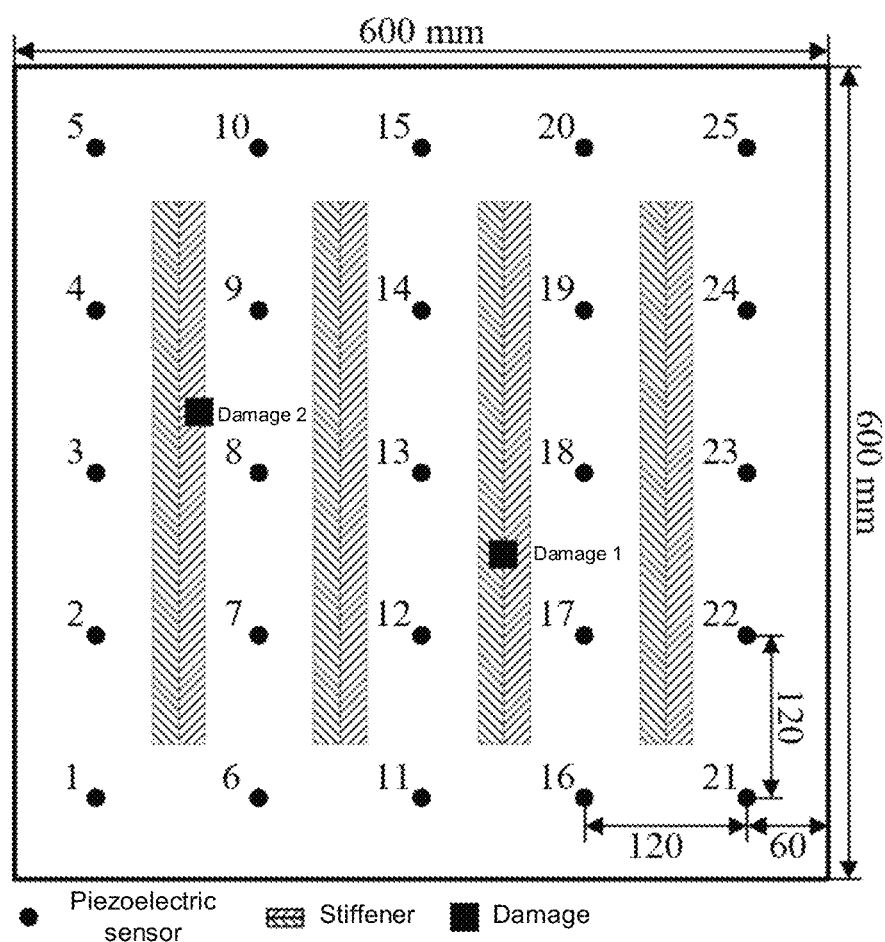
FIG. 2a shows a schematic diagram of a stiffened carbon fiber composite plate according to an embodiment of the present disclosure.
Figure 2B:
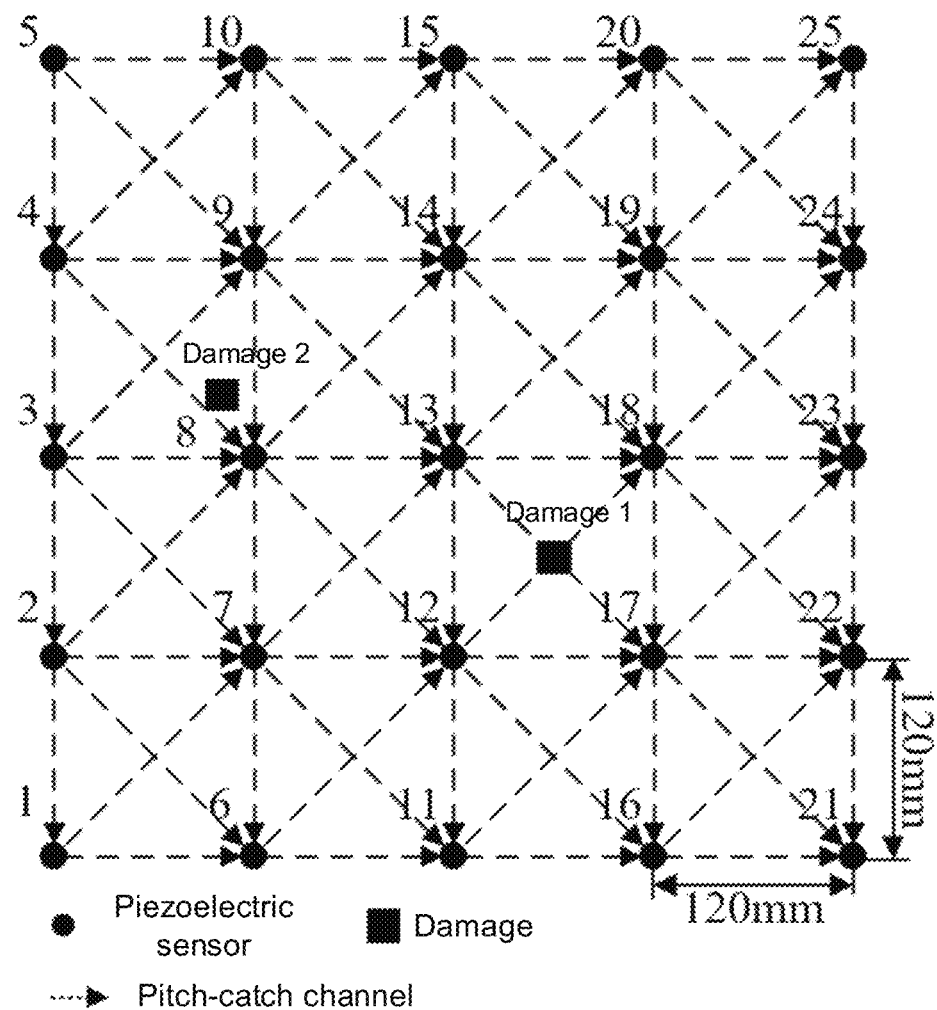
FIG. 2b shows a schematic diagram of the distribution of a piezoelectric sensor network and pitch-catch channels.
Figure 3:
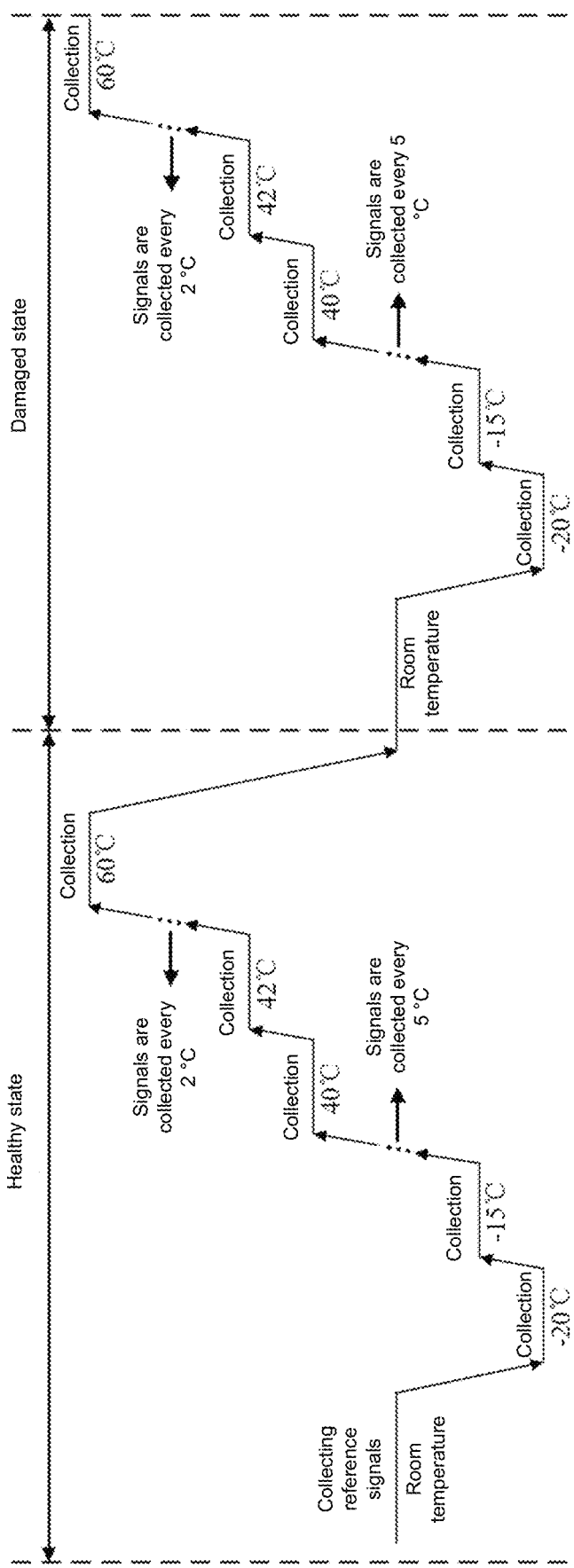
FIG. 3 shows a schematic diagram of a temperature variation range setting and data acquisition process.

FIG. 2a shows the structure of a stiffened carbon fiber composite plate having a size of 600 mm×600 mm×3 mm (length×width×thickness) used in this embodiment. The plate has 4 stiffeners with a length of 400 mm. Any two adjacent stiffeners are spaced by an interval of 120 mm from each other. In order to monitor the damage on the structure, a piezoelectric sensor network is arranged on it. The piezoelectric sensor network includes 25 piezoelectric sensors numbered 1 to 25. Any two adjacent piezoelectric sensors are spaced by an interval of 120 mm from each other, which constitutes a total of 72 pitch-catch channels, as shown in FIG. 2b. The temperature variation range setting and signal acquisition process of the environmental test chamber in the implementation process are shown in FIG. 3.

Figure 4A:
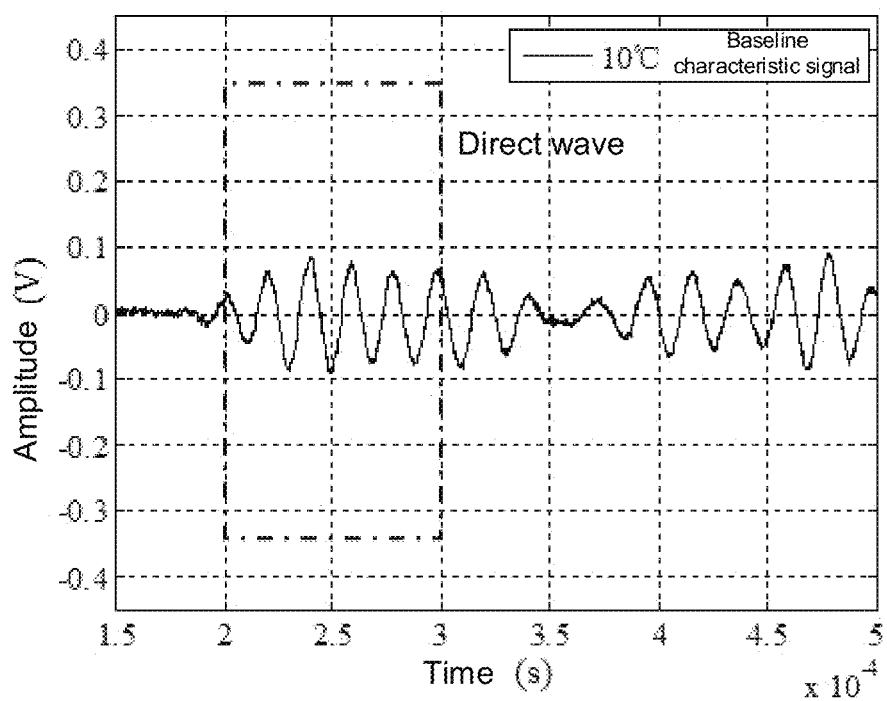
FIG. 4a shows a schematic diagram of a baseline characteristic signal at 10° C. for channel 12-18.
Figure 4B:
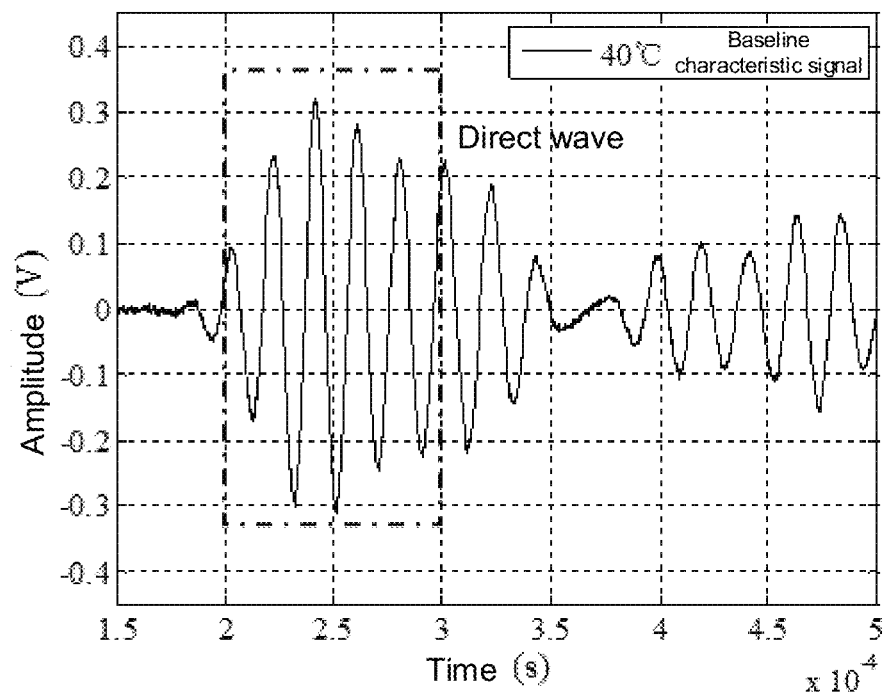
FIG. 4b shows a schematic diagram of the baseline characteristic signal at 40° C. for the channel 12-18.

When the structure was in a healthy state, firstly, the guided wave signals of the 72 pitch-catch channels were collected once at a sampling rate of 10 MHz at room temperature (25° C.) as the health baseline signals of these channels. Then the temperature of the environmental test chamber was set to −20° C., then increased from −20° C. to 60° C. In the stage of −20° C.~40° C., the guided wave signals of all pitch-catch channels were collected every 5° C. In the stage of 40° C.~60° C., the guided wave signals of all the pitch-catch channels were collected every 2° C. The guided wave signals of all pitch-catch channels were collected for a total of 23 times from −20° C. to 60° C. The difference between the 23 times of the guided wave signals and the baseline signals of each channel was made to obtain 23 sets of baseline characteristic signals of each channel. Taking the channel 12-18 as an example, the baseline characteristic signals corresponding to 10° C. and 40° C. of the channel are shown in FIGS. 4a-4b.

The damage 1 shown in FIGS. 2a-2b was applied to the structure, and the structure was in a damage monitoring state at this time. Similarly, the above-mentioned temperature change control and data acquisition process were repeated, as shown in FIG. 3, 23 sets of monitoring signals for each channel can be collected, the difference between the monitoring signals and their respective baseline signals was made, to obtain 23 sets of monitoring characteristic signals for each channel.

Figure 5:
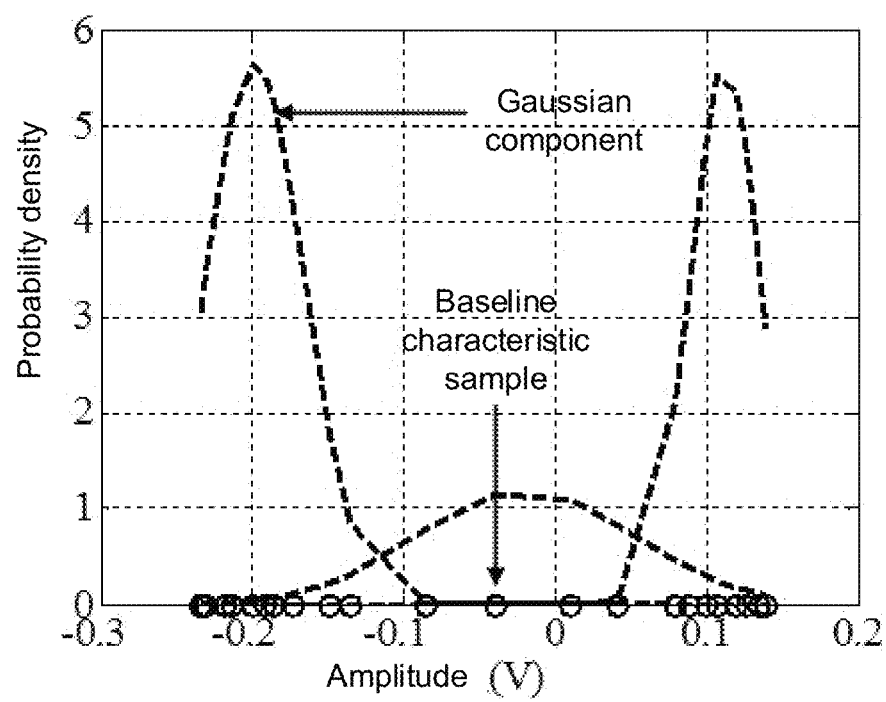
FIG. 5 shows a schematic diagram of a baseline characteristic sample set and a baseline Gaussian mixture model for a $530^{th}$ sampling point of a direct wave of the channel 12-18.

For each of the 72 channels, all sampling points in the direct band of the channel were selected to construct a baseline Gaussian mixture model. Still taking the channel 12-18 as an example, the direct band of the channel 12-18 lasted from $2 \times 10^{-4}$ s to $3 \times 10^{-4}$ s, and contained a total of 1000 sampling points at a sampling rate of 10 MHz. Since the channel 12-18 has 23 sets of baseline characteristic signals, each sampling point in the direct wave corresponds to 23 amplitudes, a baseline characteristic sample set containing 23 samples can be established, and a baseline Gaussian mixture model was constructed on this basis to describe the uncertainty distribution of the baseline characteristic sample set. FIG. 5 shows the baseline characteristic sample set and the baseline Gaussian mixture model for the 530th sampling point of the direct wave of the channel 12-18. The number of Gaussian components is three.

Figure 6A:
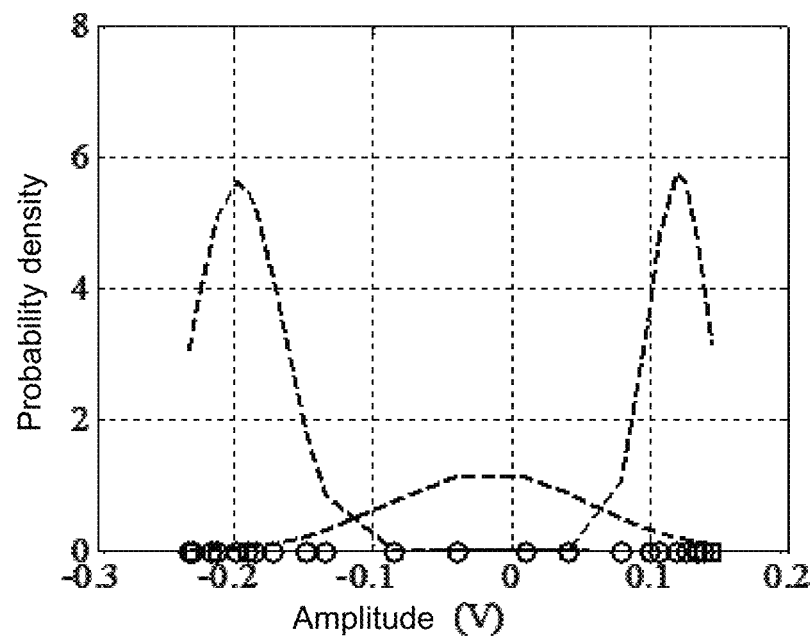
FIG. 6a shows a schematic diagram of a monitoring Gaussian mixture model for the first update for the $530^{th}$ sampling point of the direct wave of the channel 12-18.
Figure 6B:
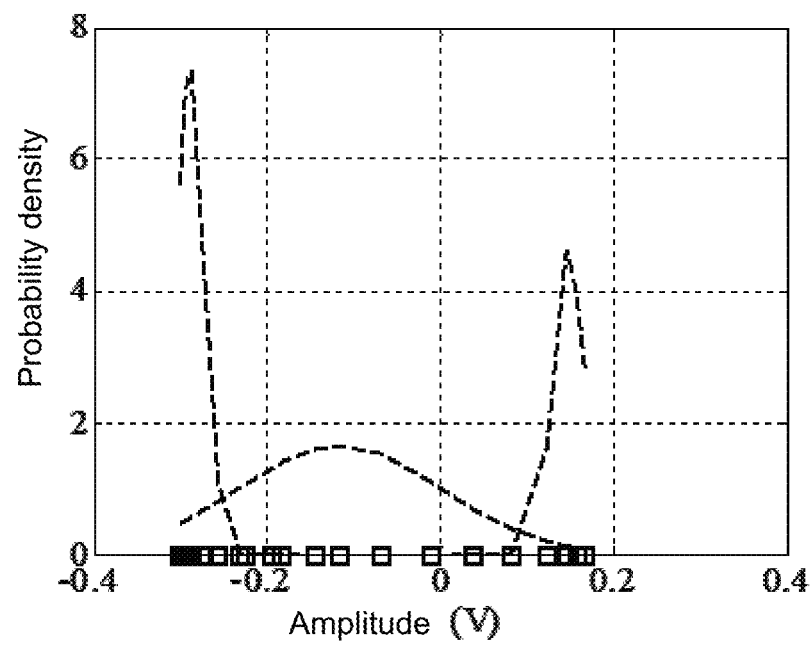
FIG. 6b shows a schematic diagram of the monitoring Gaussian mixture model for the 23rd update for the $530^{th}$ sampling point of the direct wave of the channel 12-18.
Figure 7A:
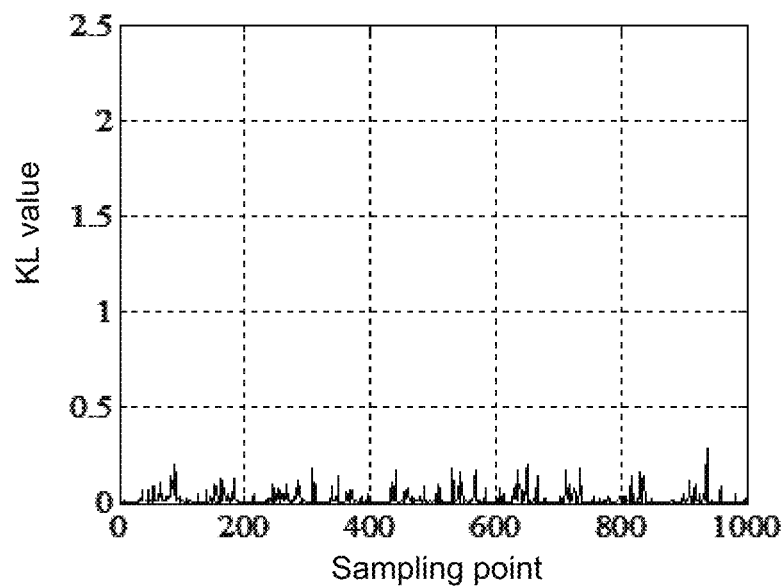
FIG. 7a shows a schematic diagram of a time-invariant description of a signal amplitude of the channel 12-18 for the first update.
Figure 7B:
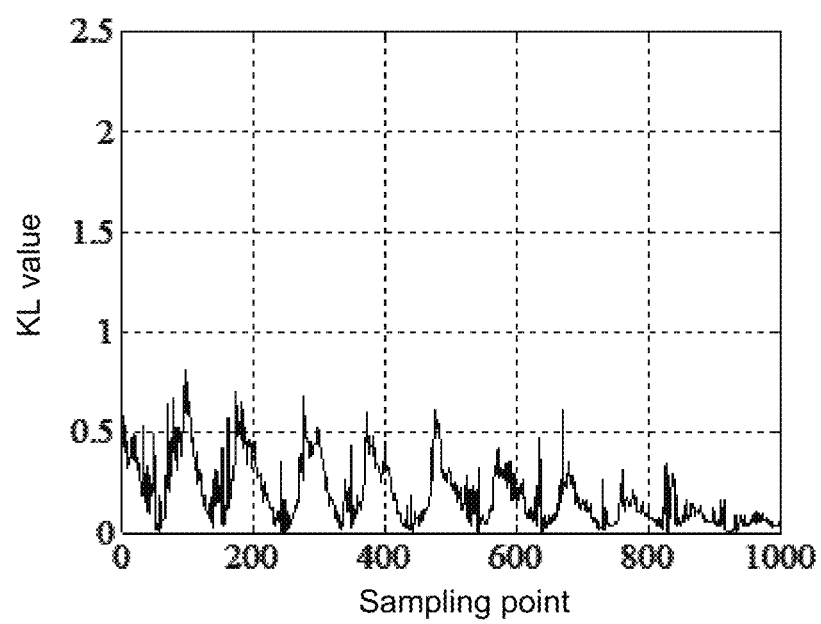
FIG. 7b shows a schematic diagram of the time-invariant description of the signal amplitude of the channel 12-18 for the $15^{th}$ update.
Figure 7C:
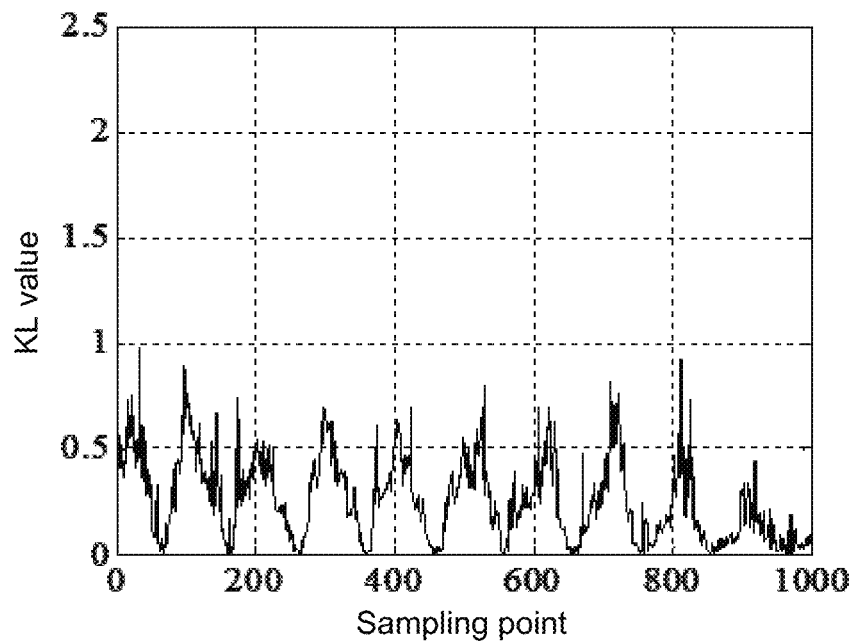
FIG. 7c shows a schematic diagram of the time-invariant description of the signal amplitude of the channel 12-18 for the $10^{th}$ update.
Figure 7D:
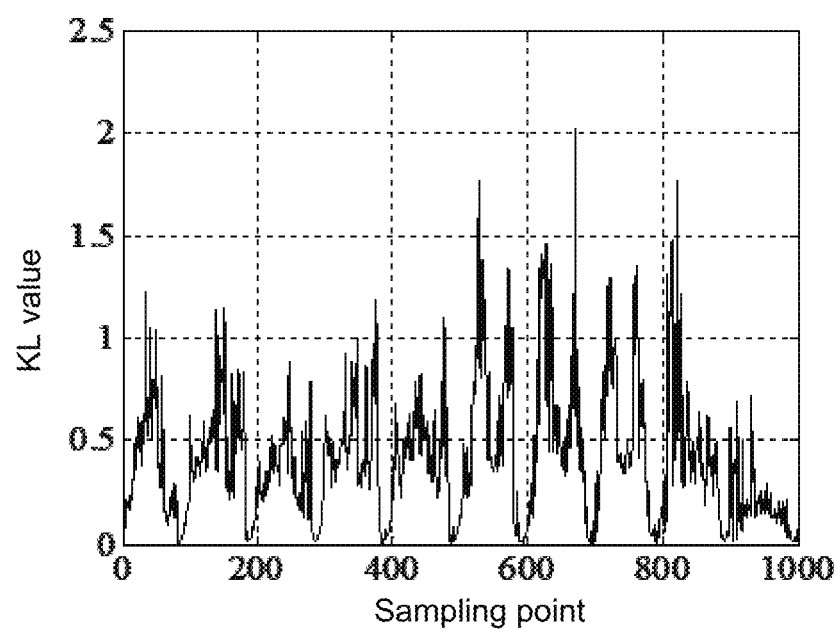
FIG. 7d shows a schematic diagram of the time-invariant description of the signal amplitude of the channel 12-18 for the $23^{rd}$ update.
Figure 8A:
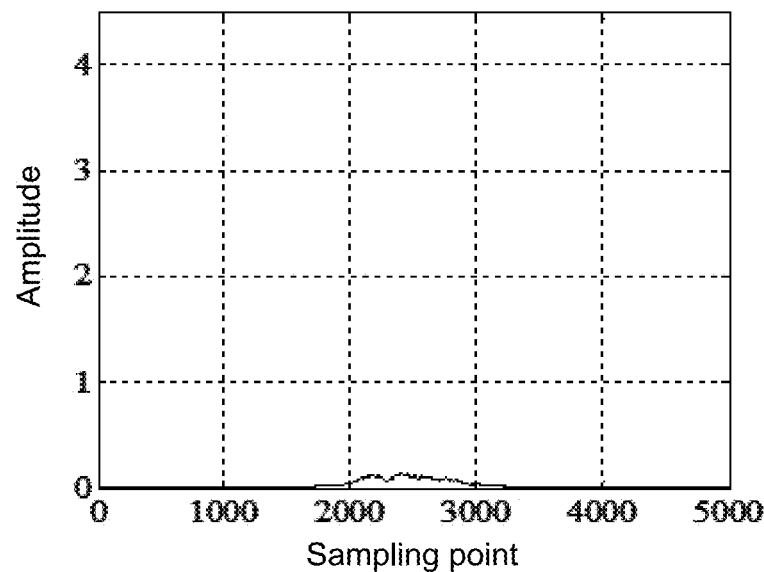
FIG. 8a shows a schematic diagram of a time-invariant characteristic signal of the channel 12-18 for the first update.
Figure 8B:
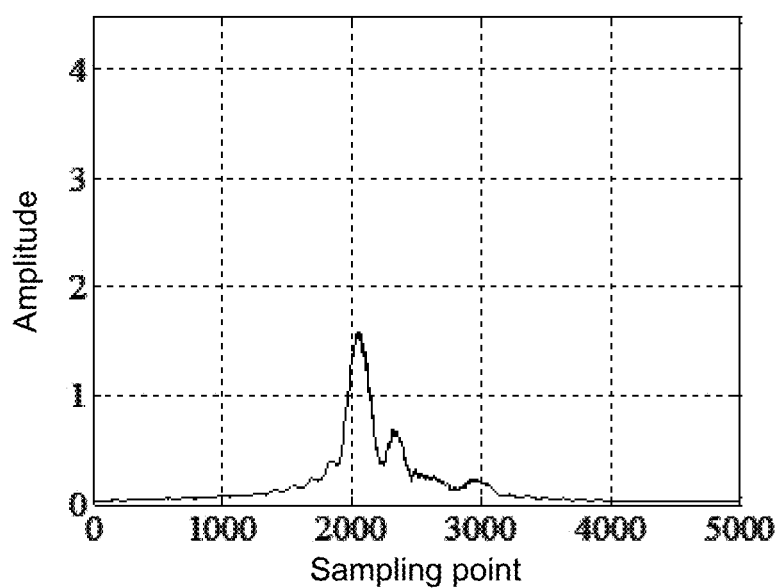
FIG. 8b shows a schematic diagram of the time-invariant characteristic signal of the channel 12-18 for the 10th update.
Figure 8C:
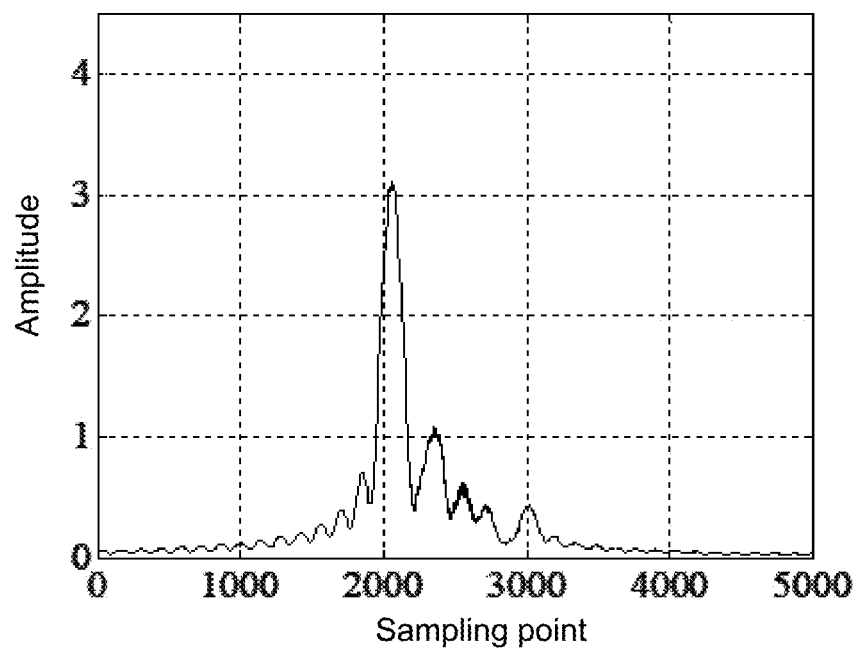
FIG. 8c shows a schematic diagram of the time-invariant characteristic signal of the channel 12-18 for the 15th update.
Figure 8D:
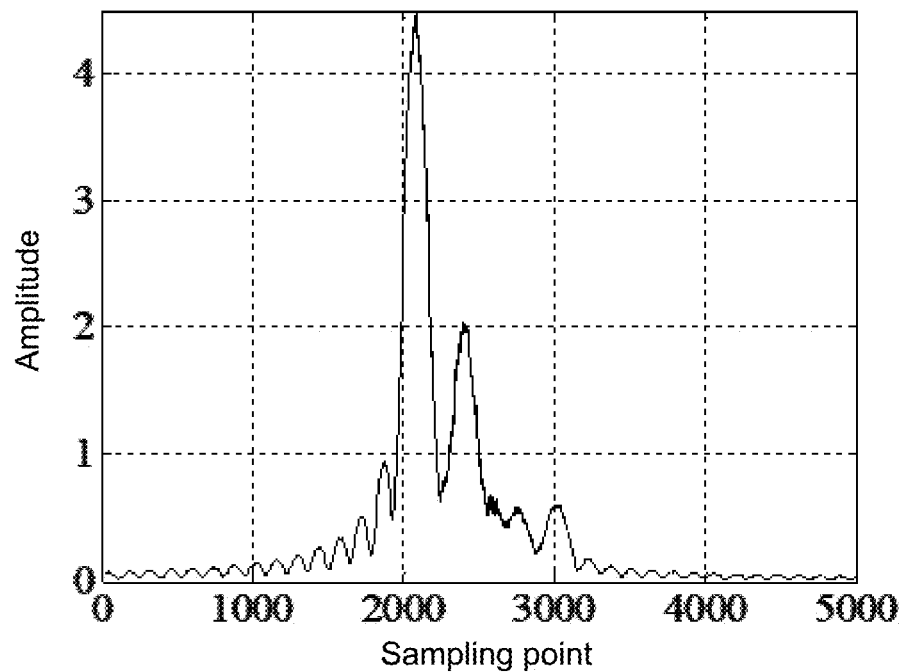
FIG. 8d shows a schematic diagram of the time-invariant characteristic signal of the channel 12-18 for the 23rd update.
Figure 9A:
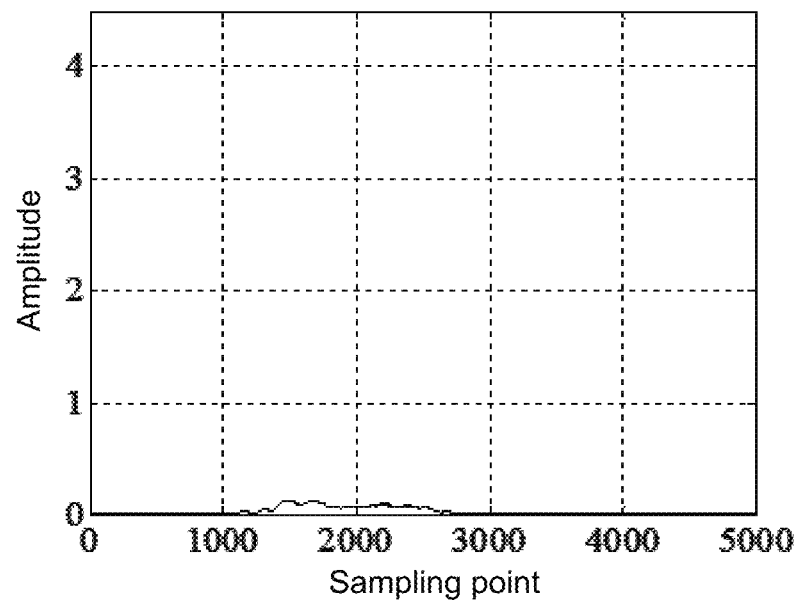
FIG. 9a shows a schematic diagram of a time-invariant characteristic signal of the channel 12-13 for the first update.
Figure 9B:
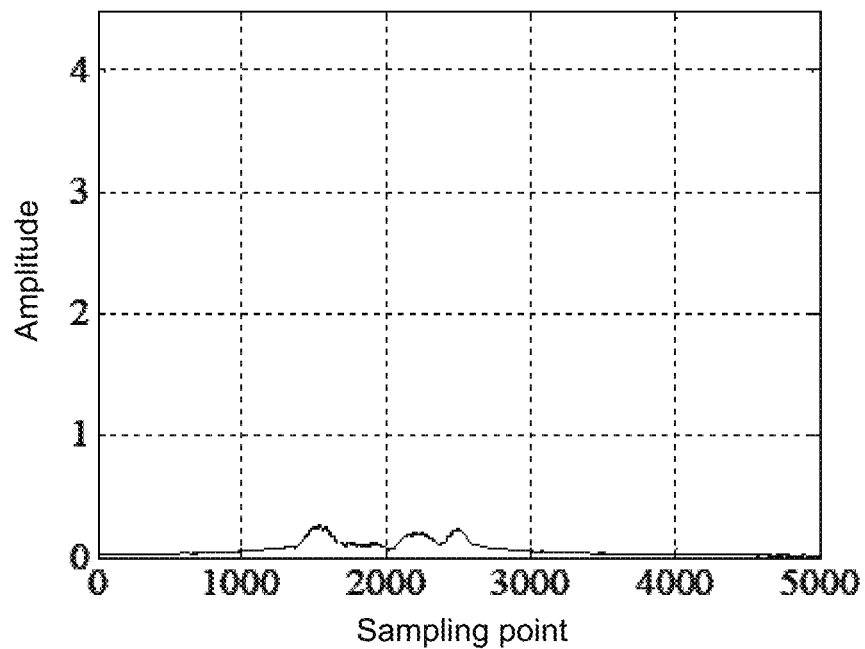
FIG. 9b shows a schematic diagram of the time-invariant characteristic signal of the channel 12-13 for the 10th update.
Figure 9C:
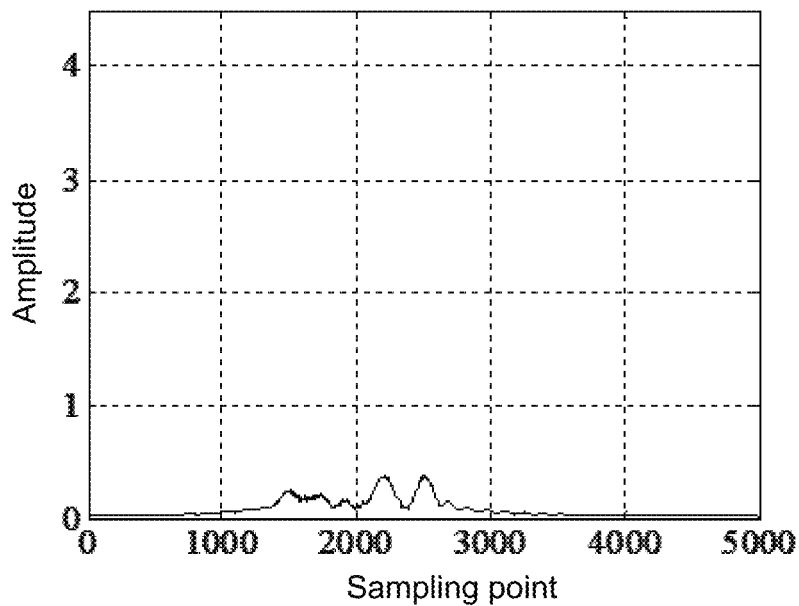
FIG. 9c shows a schematic diagram of the time-invariant characteristic signal of the channel 12-13 for the 15th update.
Figure 9D:
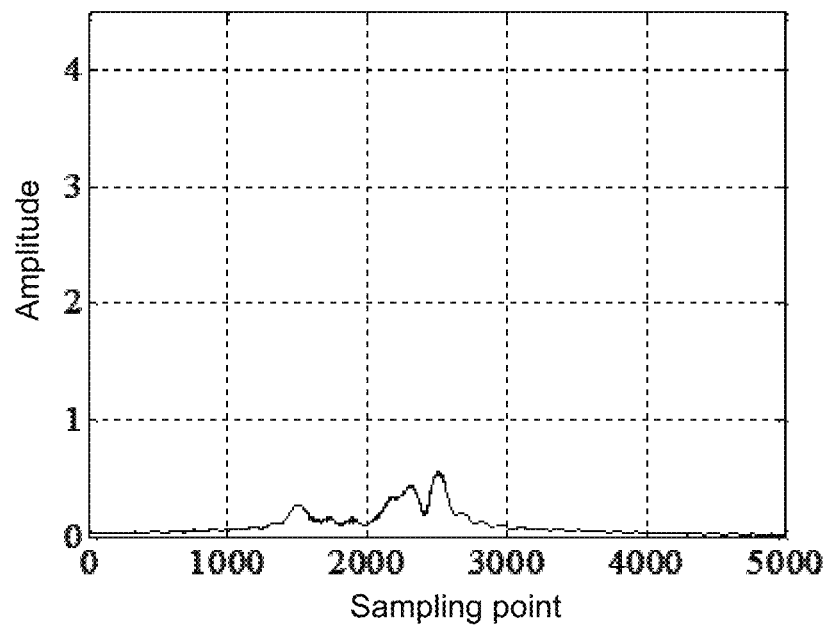
FIG. 9d shows a schematic diagram of the time-invariant characteristic signal of the channel 12-13 for the 23rd update.

After constructing the baseline Gaussian mixture model for each sampling point of each channel, the 23 sets of monitoring characteristic signals of each channel were used to continuously update the baseline characteristic sample set of each sampling point. A monitoring characteristic sample set was established for each update, and the monitoring Gaussian mixture model was constructed for each update. The number of update is 23 in total. FIG. 6a shows a Gaussian mixture model for the first update at the 530th sampling point of the channel 12-18, and FIG. 6b shows a Gaussian mixture model corresponding to the 23rd update.

For each update, the Kullback-Leibler (KL) distance between the monitoring Gaussian mixture model and the baseline Gaussian mixture model for each sampling point was calculated, and the time-invariant description consisting of the KL distance corresponding to this update could be obtained. FIGS. 7a-7d show the time-variant descriptions of the signal amplitudes generated by channel 12-18 at the 1st, 10th, 15th, and 23rd updates, respectively, with a length of 1000 sampling points. To construct a complete signal, the number of the sampling points was zero-filled to 5000 both before and after the above time-invariant descriptions, and smooth filtering was performed based on Shannon continuous complex wavelet transform, to construct the corresponding time-invariant characteristic signal, as shown in FIGS. 8a-8d. It can be seen from the figures that with the continuous update, the time-invariant characteristic signal of the channel gradually increases. For comparison, FIGS. 9a-9d respectively show the time-invariant characteristic signal of channel 12-13 during the 1st, 10th, 15th, and 23rd updates. It can be seen that the time-invariant characteristic signal of the channel 12-13 during the update process is kept to a small extent. This phenomenon is consistent with the actual situation that the channel 12-18 passes through damage 1 and is greatly affected by the damage 1, and the channel 12-13 is far away from the damage 1 and is less affected by the damage 1. Therefore, the time-invariant characteristic signal of each channel may be further used for damage imaging and localization.

Figure 10A:
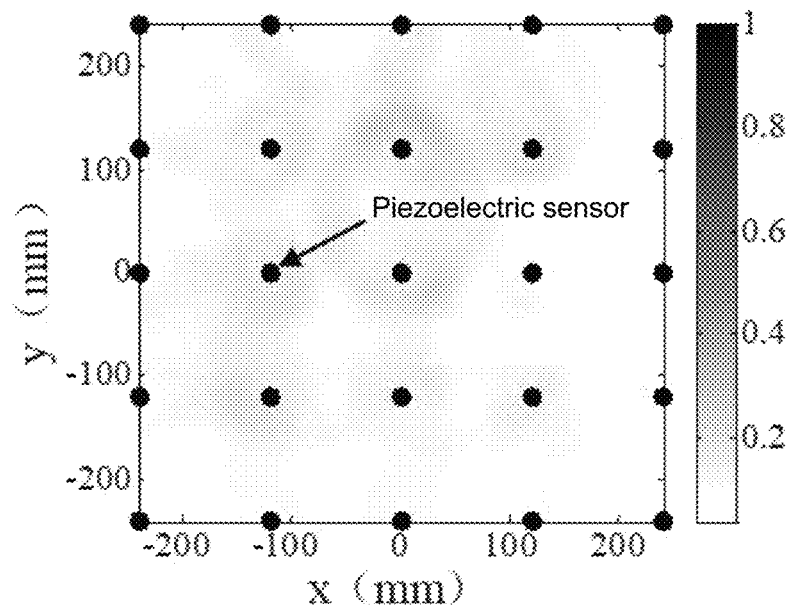
FIG. 10a shows a schematic diagram of a four-dimensional imaging result of damage 1 for the first update.
Figure 10B:
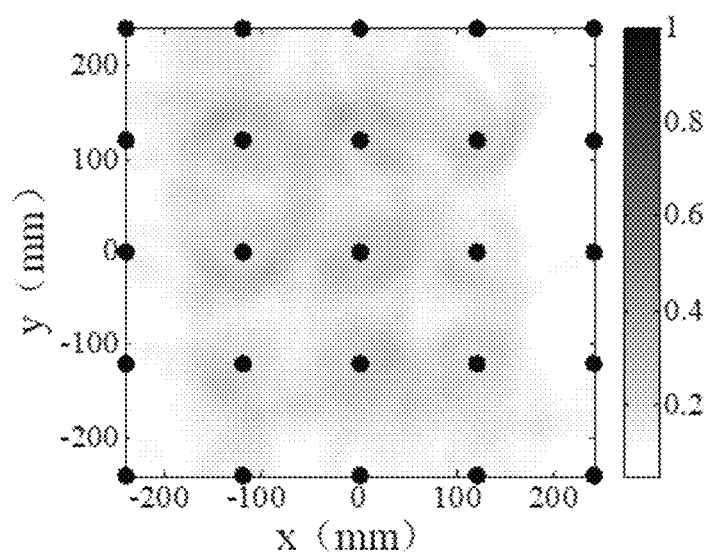
FIG. 10b shows a schematic diagram of the four-dimensional imaging result of the damage 1 for the fifth update.
Figure 10C:
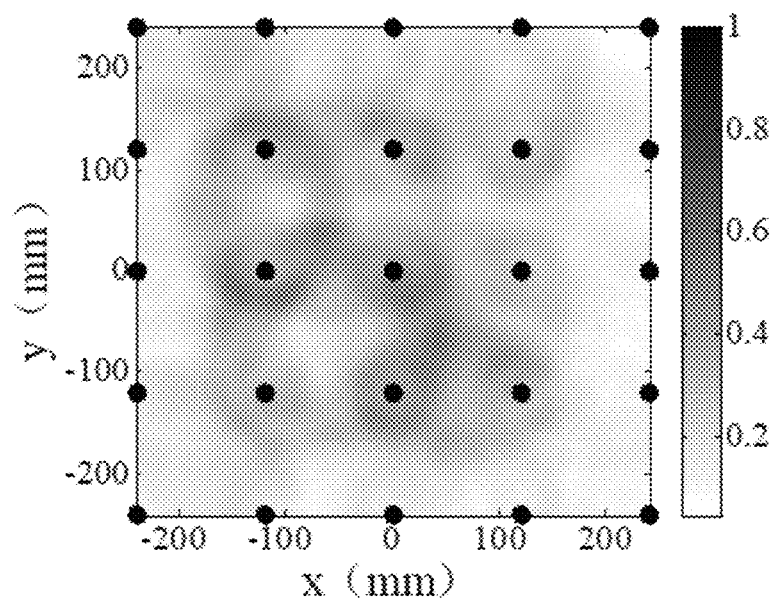
FIG. 10c shows a schematic diagram of the four-dimensional imaging result of the damage 1 for the 10th update.
Figure 10D:
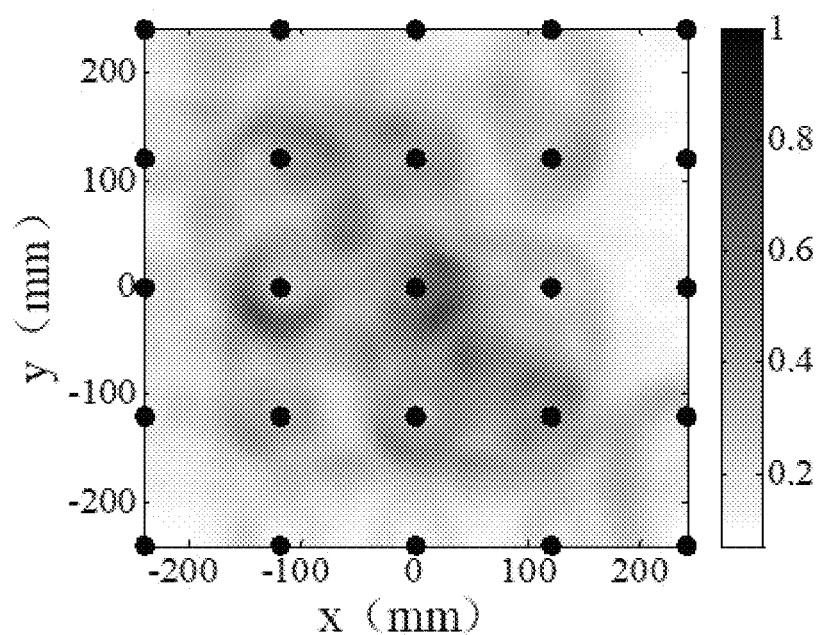
FIG. 10d shows a schematic diagram of the four-dimensional imaging result of the damage 1 for the 15th update.
Figure 10E:
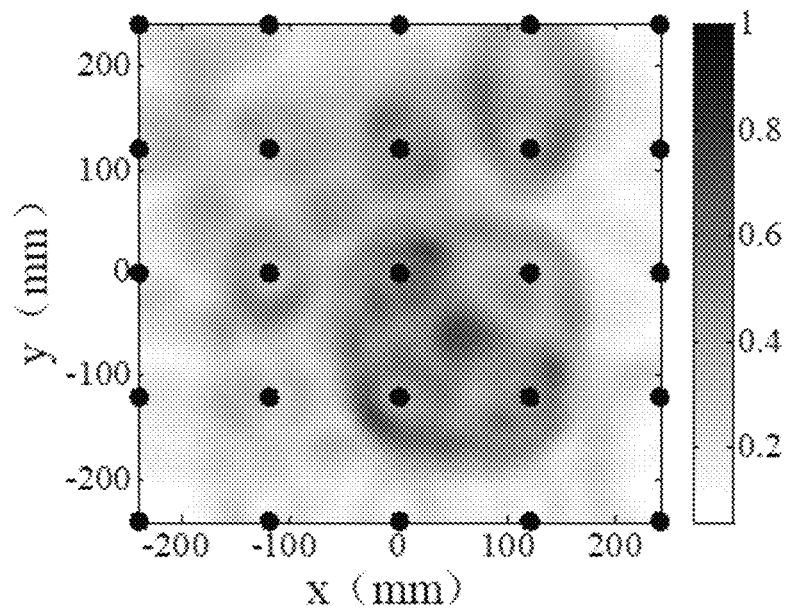
FIG. 10e shows a schematic diagram of the four-dimensional imaging result of the damage 1 for the 20th update.
Figure 10F:
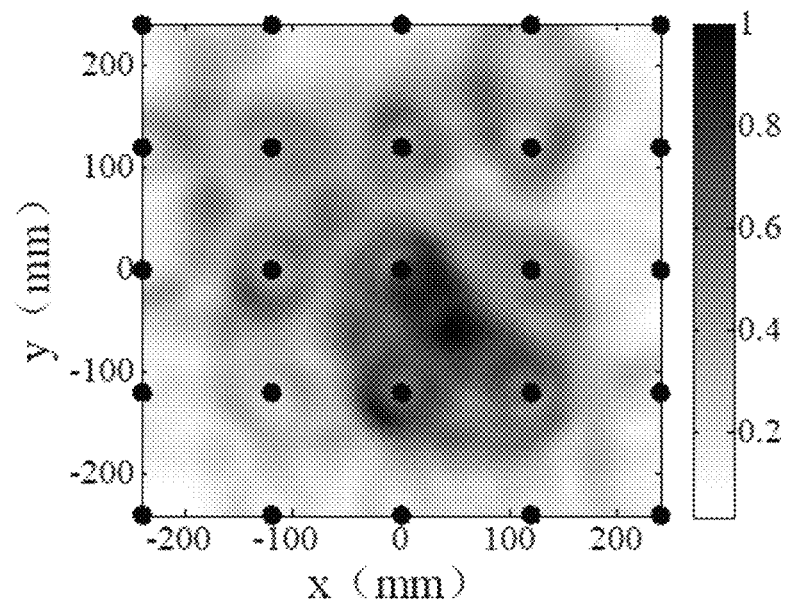
FIG. 10f shows a schematic diagram of the four-dimensional imaging result of the damage 1 for the 23rd update.
Figure 10G:
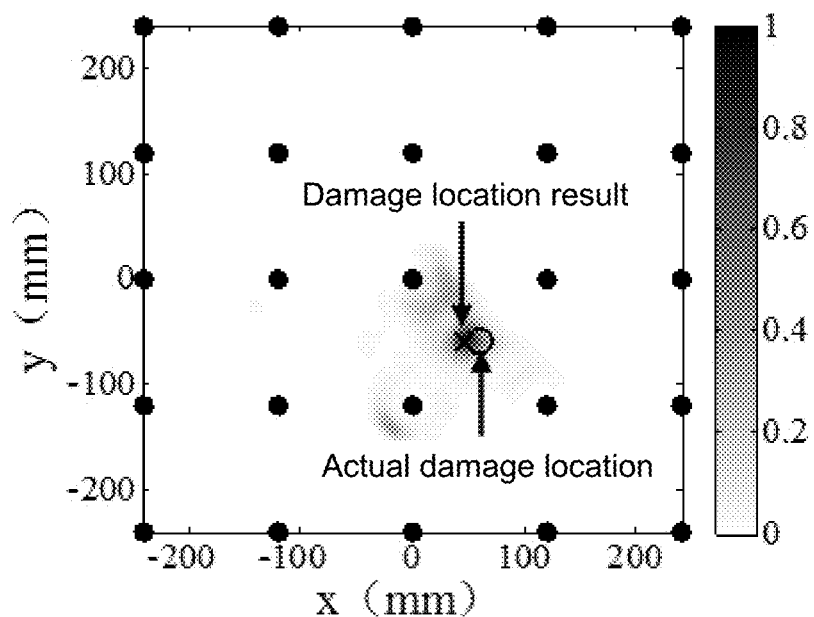
FIG. 10g shows a schematic diagram of a final damage location result of the damage 1.
Figure 11A:
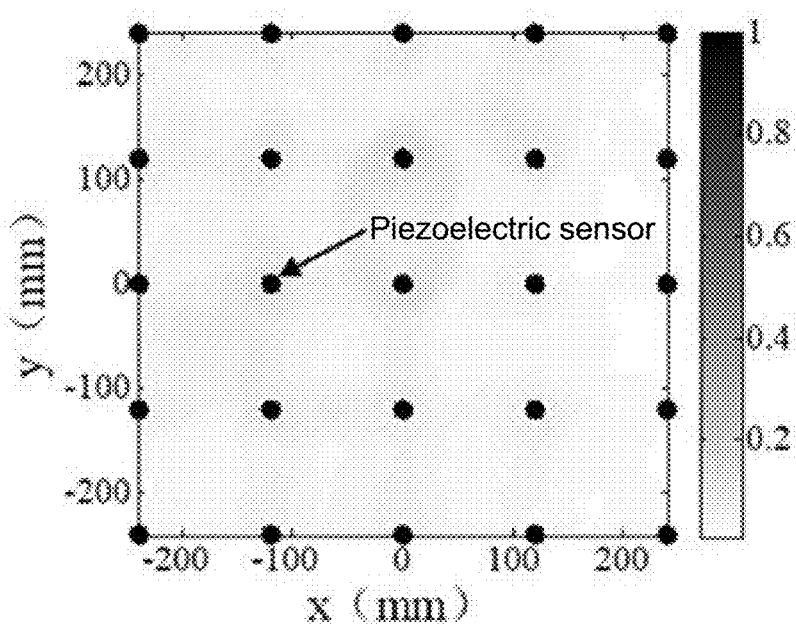
FIG. 11a shows a schematic diagram of a four-dimensional imaging result of damage 2 for the first update.
Figure 11B:
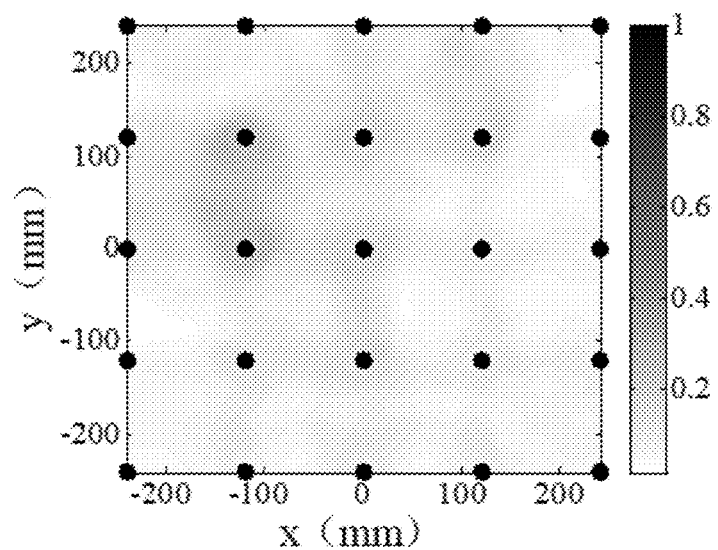
FIG. 11b shows a schematic diagram of the four-dimensional imaging result of the damage 2 for the fifth update.
Figure 11C:
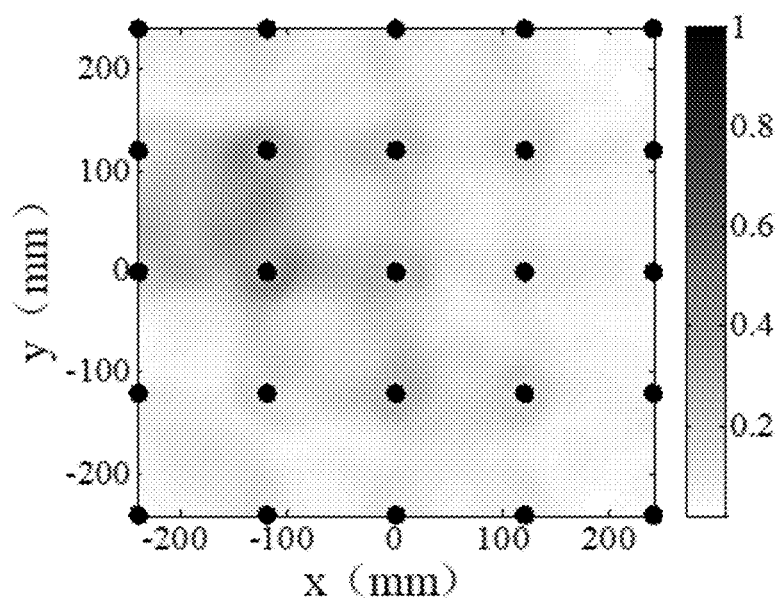
FIG. 11c shows a schematic diagram of the four-dimensional imaging result of the damage 2 for the 10th update.
Figure 11D:
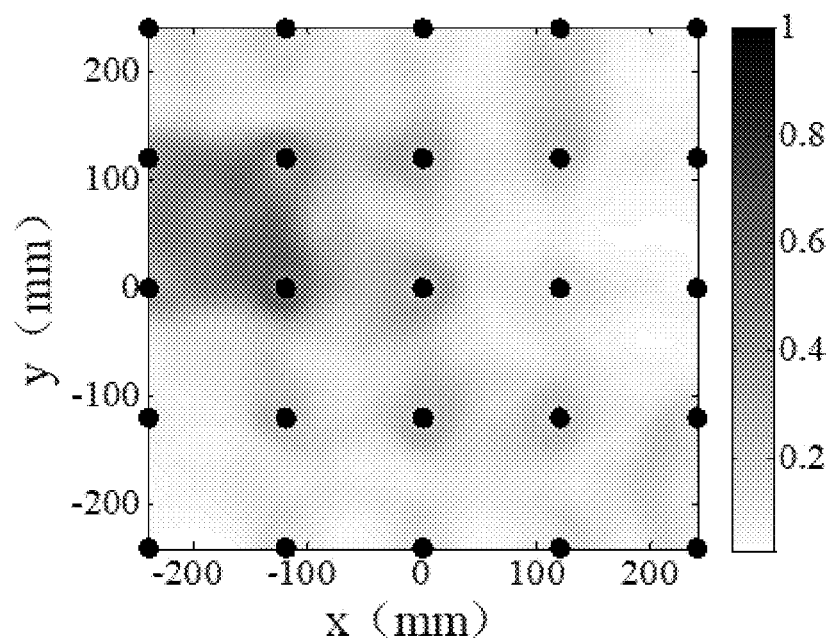
FIG. 11d shows a schematic diagram of the four-dimensional imaging result of the damage 2 for the 15th update.
Figure 11E:
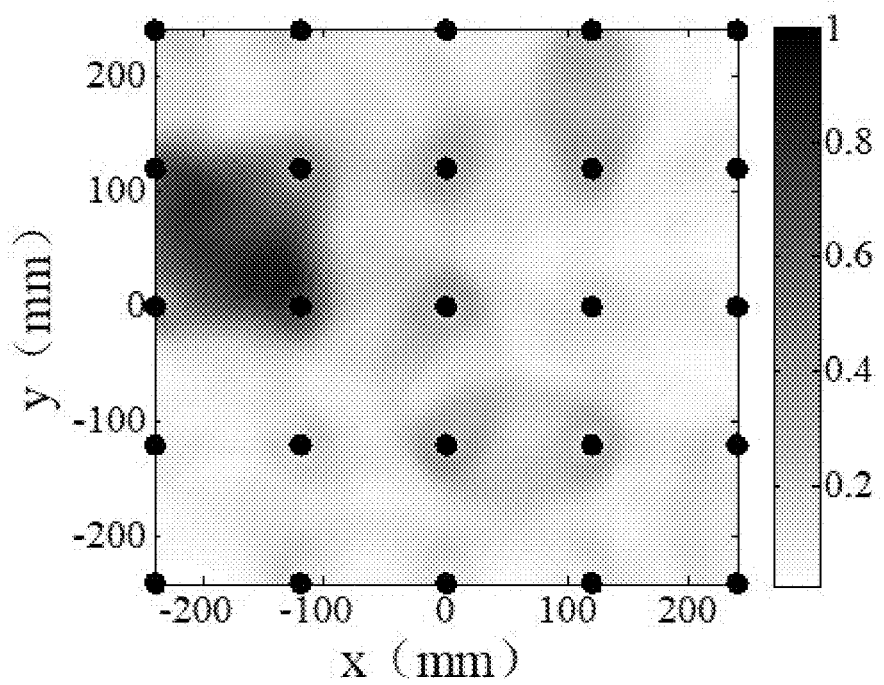
FIG. 11e shows a schematic diagram of the four-dimensional imaging result of the damage 2 for the 20th update.
Figure 11F:
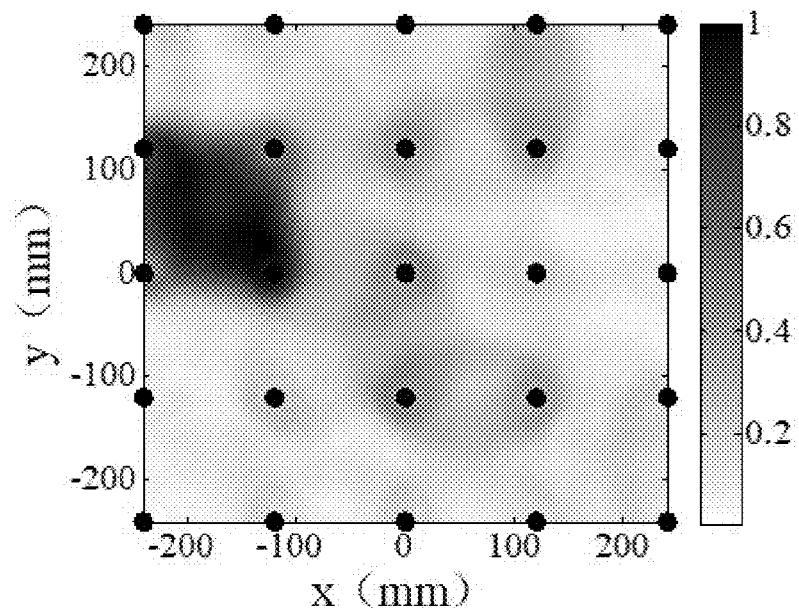
FIG. 11f shows a schematic diagram of the four-dimensional imaging result of the damage 2 for the 23rd update.
Figure 11G:
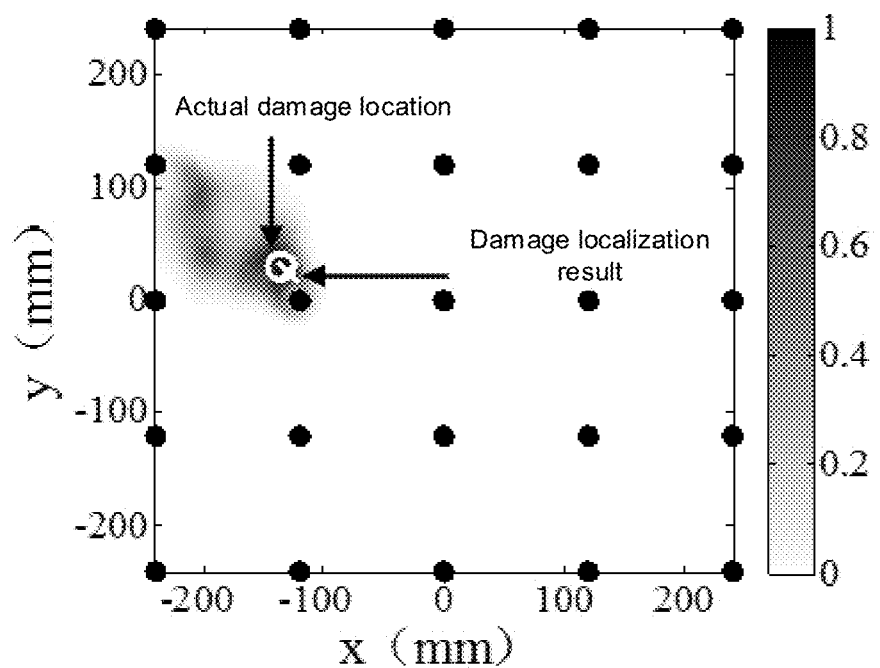
FIG. 11g shows a schematic diagram of a final damage location result of the damage 2.

After obtaining the time-invariant characteristic signals of all 72 pitch-catch channels, firstly, the envelope of the time-invariant characteristic signal of each channel was constructed by using the Shannon continuous complex wavelet transform, then damage imaging was performed by using the delay-and-sum method. The wave velocity used is 1186 m/s. During the entire monitoring process, with the continuous updating of the time-invariant characteristic signal of each channel, four-dimensional imaging of the damage can be achieved, thereby generating a series of imaging results that continuously accumulate damage information and highlight the damage location. FIGS. 10a-10f show the four-dimensional imaging results of damage 1, FIG. 10g shows the focus-processed image of the imaging result at the 23rd update. It is finally determined the location of the damage, and that the location error is 9.0 mm.

According to the above process, damage 2 is further arranged on the structure and four-dimensional imaging is performed. The results are shown in FIGS. 11a-11g, and the final damage location error is only 6.4 mm.

There are many specific application methods of the present disclosure. The above are only the preferred embodiments of the present disclosure. It should be noted that for those skilled in the art, there can be several improvements without departing from the principle of the present disclosure. These improvements should also be regarded as the protection scope of the present disclosure.

We claim:

1. A four-dimensional imaging method for structural damage based on a time-invariant characteristic signal, comprising:

disposing a piezoelectric sensor network on an aviation structure, wherein the piezoelectric sensor network comprises a plurality of piezoelectric sensors, pitch-catch channels are formed between the piezoelectric sensors, and one pitch-catch channel is formed between each two adjacent piezoelectric sensors;

constructing a time-invariant characteristic signal of each pitch-catch channel to describe influence on the channel caused by physical damages, wherein the time-invariant characteristic signal is unaffected by time-varying environmental conditions, wherein the time-varying environmental conditions comprise temperature variations, wherein a physical damage is applied to the aviation structure under time-varying environmental conditions;

imaging the physical damage based on the time-invariant characteristic signals of all the pitch-catch channels in a four-dimensional manner; and locating the physical damage on the aviation structure according to images resulted from imaging the physical damage in a four-dimensional manner.

2. The four-dimensional imaging method for structural damage based on a time-invariant characteristic signal according to claim 1, wherein constructing the time-invariant characteristic signal further comprises:

(11) obtaining R groups of baseline characteristic signals of each pitch-catch channel, wherein each group of the baseline characteristic signals contains T sampling points, R and T are natural numbers greater than 1, each group of the R groups of baseline characteristic signals of each pitch-catch channel corresponds to a temperature of the aviation structure, and a range of the temperature at least comprises −20° C. to 60° C.;

(12) for a sampling point indexed by t in the baseline characteristic signals, $1 \leq t \leq T$, constructing a baseline characteristic sample set $X_b(t) = \{A_1, \ldots, A_r, \ldots, A_R\}$ for the sampling point, wherein $A_r$ is an amplitude of an rth baseline characteristic signal at the sampling point indexed by t, $1 \leq r \leq R$, constructing a baseline Gaussian mixture model $\Phi_b(t)$ for the sampling point t based on $X_b$, to describe an uncertainty distribution of $X_b(t)$ under the influence of the time-varying factor;

$$\Phi_b(t) = \sum_{k=1}^{K} w_k \Phi_k\left(A_r \mid \mu_k, \sum_k\right)$$

wherein K is a number of Gaussian components in the baseline Gaussian mixture model $\Phi_b(t)$, $\mu_k$ is a mean vector of a kth Gaussian component, $\Sigma_k$ is a covariance matrix of the kth Gaussian component, $w_k$ is a weight of the kth Gaussian component, $k=1, 2, \ldots, K$, a probability density function of $\Phi_k$ is expressed as follows:

$$\Phi_k\left(A_r \mid \mu_k, \sum_k\right) = \frac{1}{(2\pi)^{\frac{1}{2}} \left|\sum_k\right|^{\frac{1}{2}}} e^{-\frac{1}{2}(A_r - \mu_k)^T \Sigma_k^{-1}(A_r - \mu_k)};$$

(13), updating a probability statistical model for the sampling point indexed by t for each monitoring characteristic signal acquired, for an nth update, $1 \leq n \leq N$, updating the baseline characteristic sample set of the sampling point t to an nth monitoring characteristic sample set $X_m^n(t) = \{A_{n+1}, \ldots, A_R, \ldots, A_{R+n}\}$, wherein $A_{R+n}$ is an amplitude of the monitoring characteristic signal obtained at the nth update at the sampling point t, and constructing a monitoring Gaussian mixture model $\Phi_m^n(t)$ for the nth update based on $X_m^n$, to describe an uncertainty distribution of $X_m^n(t)$ under the influence of the time-varying factor;

(14) for a sampling point indexed by t, using a Kullback-Leibler (KL) distance to quantify a degree of migration change of the monitoring Gaussian mixture model $\Phi_m^n(t)$ relative to the baseline Gaussian mixture model $\Phi_b(t)$ of the sampling point t, and obtaining a time-invariant description KL(t, n) of a signal amplitude characteristic at the sampling point indexed by t at the nth update;

$$KL(t, n) = \frac{1}{2}\left\{tr\left[\sum_m{}^n(t)^{-1} \sum_b(t)\right] + [\mu_m^n(t) - \mu_b(t)]^T \sum_m{}^n(t)^{-1}[\mu_m^n(t) - \mu_b(t)] - 1 - \ln\frac{\det\sum_m^n(t)}{\det\sum_b(t)}\right\}$$

wherein tr is a trace of a matrix, $\Sigma_m^n(t)$ is a covariance matrix of $\Phi_m^n(t)$, $\Sigma_b(t)$ is a covariance matrix of $\Phi_b(t)$, $\mu_m^n(t)$ is a mean matrix of $\Phi_m^n(t)$, $\mu_b(t)$ is the mean matrix of $\Phi_b(t)$, and det is a determinant of the matrix;

(15) repeating operations (12) (13) and (14), sequentially quantifying a degree of migration change of the probability statistical model of all of the sampling points within 1 T, obtaining the time-invariant description for the corresponding sampling point and smooth filtering the time-invariant descriptions of all the sampling points based on the continuous complex wavelet transform to construct the time-invariant characteristic signal for the nth update.

3. The four-dimensional imaging method for structural damage based on a time-invariant characteristic signal according to claim 1, wherein imaging the physical damage in a four-dimensional manner comprises:

(21) separately constructing a time-invariant characteristic signal $E_z^n$ for each pitch-catch channel at the nth update, and fusing the time-invariant characteristic signal of each pitch-catch channel by using a delay-and-sum imaging method which further comprises:

calculating an estimated arrival time $t_z(x, y)$ of a signal at any point (x, y) in a monitoring area of the aviation structure on each of the pitch-catch channels by the following formula:

$$t_z(x, y) = t_{off} + t_{travel} = t_{off} + \frac{\sqrt{(x_z^a - x)^2 + (y_z^a - y)^2} + \sqrt{(x_z^s - x)^2 + (y_z^s - y)^2}}{v}$$

wherein $t_{off}$ is a time offset corresponding to an excitation signal, $t_{travel}$ is a time required for the guided wave signal to propagate from an exciter of a certain pitch-catch channel z to point (x, y) and then to a sensor of the certain pitch-catch channel z, v is an average group velocity of the guided wave signal of each of the pitch-catch channels in the aviation structure, $(x_z^a, y_z^a)$ is a coordinate of the exciter of the certain pitch-catch channel z, and $(x_z^s, y_z^s)$ is a coordinate of the sensor of the certain pitch-catch channel z;

obtaining a corresponding value of the point (x, y) in a time-invariant characteristic signal envelope $E_z^n$ of the certain pitch-catch channel z according to $t_z(x, y)$, calculating the probability of damage occurrence $E''(x, y)$ of the point $(x, y)$ according to the following formula, and using the calculated probability as a pixel value for damage imaging, $$E^n(x, y) = \sum_{z=1}^{Z} E_z^n(x, y);$$

(22) continuously updating the time-invariant characteristic signal of each channel, repeating operation (21) for each update, thereby gradually generating N images, including a final Nth image;

(23) transforming a pixel value $E^N(x, y)$ of each point in the final Nth image as follows, and searching for the point with the maximal pixel value, which is configured to subsequently approximate the position of the physical damage, $$E^N(x,y)=[E^N(x,y)]^8 \cdot \tan(E^N(x,y))/1.5574.$$

* * * * *